Feb. 26, 1929. 1,703,604

P. W. THOMPSON ET AL

PROTECTING MEANS FOR FURNACE LININGS AND WALLS

Filed May 26, 1924 3 Sheets-Sheet 1

Inventors
P. W. Thompson,
J. W. Parker
Frank Thorp

By Shepherd & Campbell
Attorneys

Feb. 26, 1929.  1,703,604
P. W. THOMPSON ET AL
PROTECTING MEANS FOR FURNACE LININGS AND WALLS
Filed May 26, 1924   3 Sheets-Sheet 2

Inventors
P.W.Thompson
J.W.Parker
Frank Thorp
By
Attorneys

Feb. 26, 1929.

P. W. THOMPSON ET AL 1,703,604

PROTECTING MEANS FOR FURNACE LININGS AND WALLS

Filed May 26, 1924    3 Sheets-Sheet 3

Inventors
P. W. Thompson
J. W. Parker
Frank Thorp

By Shepherd & Campbell
Attorney

Patented Feb. 26, 1929.

1,703,604

UNITED STATES PATENT OFFICE.

PAUL WHEELER THOMPSON, JAMES WENTWORTH PARKER, AND FRANK THORP, OF DETROIT, MICHIGAN.

PROTECTING MEANS FOR FURNACE LININGS AND WALLS.

Application filed May 26, 1924. Serial No. 715,969.

This invention relates to furnaces and more particularly to the provision of means for the protection of furnace brickwork and refractories against the tremendous heat resulting from the burning of fuel. When solid, liquid or gaseous fuel is burned in a furnace the temperature may rise as high as 3000° F. with a resulting serious effect on the furnace brickwork and refractory material.

To protect the refractories we have invented a device which consists of a screen of tubes which is so arranged in the furnace as to be between the hot part of the flame and the refractories to be protected. This tube screen carries water inside of the tubes which keeps them comparatively cool and while said tubes absorb the radiant heat the refractories are protected, in that they are not subjected to the maximum furnace temperature. This tube screen can also be used where the refractories of a furnace cover the tubes, that is, the refractories come between the tubes and the flames where either the tubes or the refractories support the other. The tube screen carries water inside the tubes which absorbs the heat imparted to the refractories and keeps the refractories cool and below their fusion point.

This tube screen is, in a sense, a boiler, since a certain amount of steam may be generated in it, but its primary function is to protect furnace walls, linings and refractories. One of the principal features of this device is that its water circulation system is entirely independent of a main steam generator, retort, or other device whereby steam is generated or heat absorbed. The steam generated in this tube screen may, however, discharge into the main steam generator, retort or other device, or into steam mains, whereby the steam is used for heating, power or other industrial purposes. All heat absorbed by this tube screen is thereby saved. One of the principal applications of this device is to protect the furnace lining and bottom of the furnace when burning pulverized fuel. If such a device is not used the high temperature may result in serious deterioration of the furnace brickwork and the ash in the coal will melt or become soft (fused or partly fused) and stick to the sides or the bottom of the furnace, where it will gradually build up into a solid mass. We are aware of the fact that it has heretofore been proposed to locate screens of water carrying tubes in the furnaces of steam boilers. However, in known devices of this nature the tube screens are connected into the water circulating system of the main boiler, so that when one of the tubes of the tube screen fails, all the water in the main boiler is unavoidably emptied out. This condition may result in serious damage to the main boiler by overheating the boiler tubes, drums or headers. In the present invention a tube failure will empty the water from that particular tube screen only, leaving the boiler water circulating system unimpaired.

In the accompanying drawings in which like reference characters designate corresponding parts throughout the several Figures.

Figure 1:
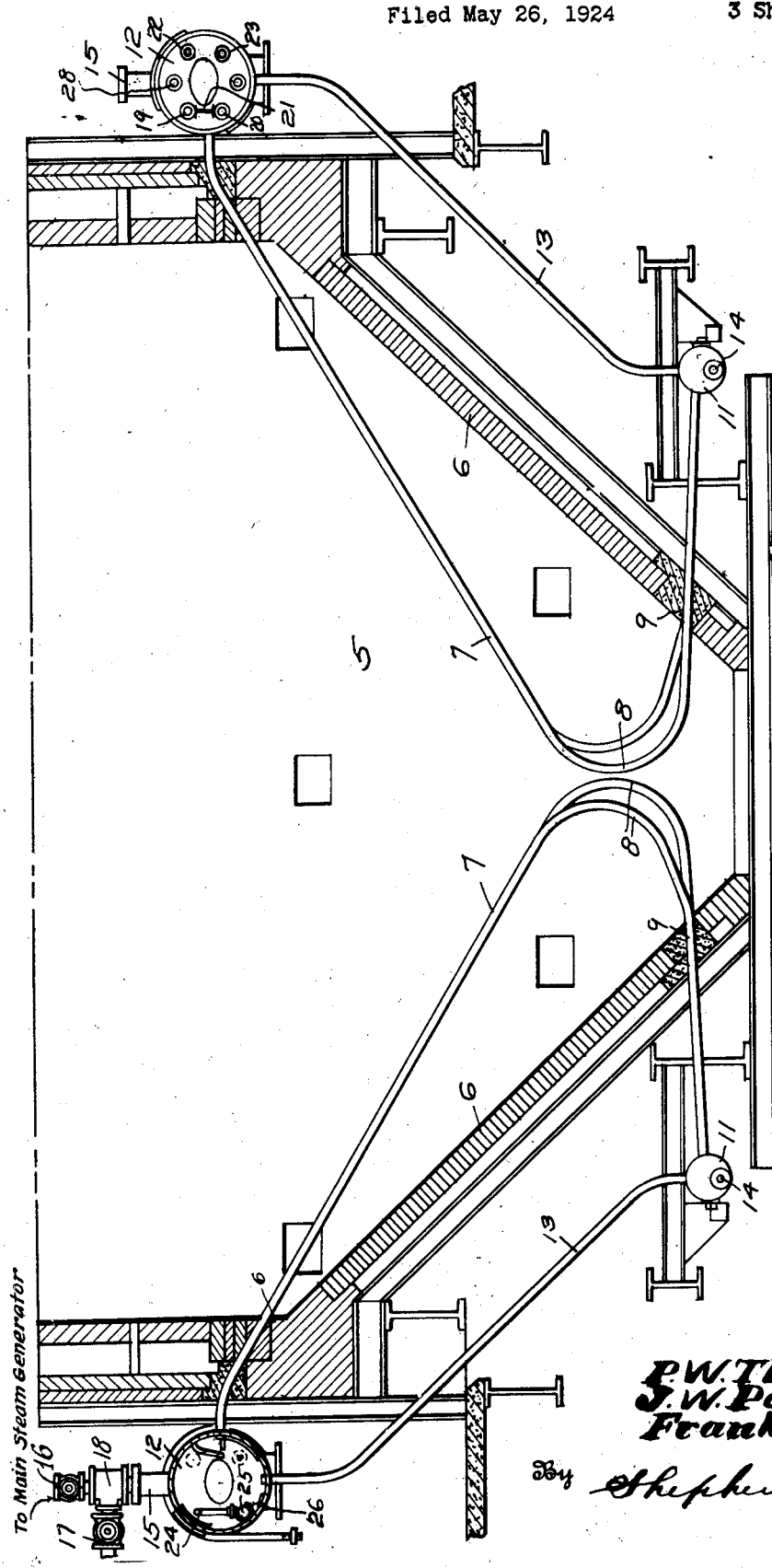
Figure 1 is a transverse sectional view through the combustion chamber of a furnace having the invention applied thereto.
Figure 2:
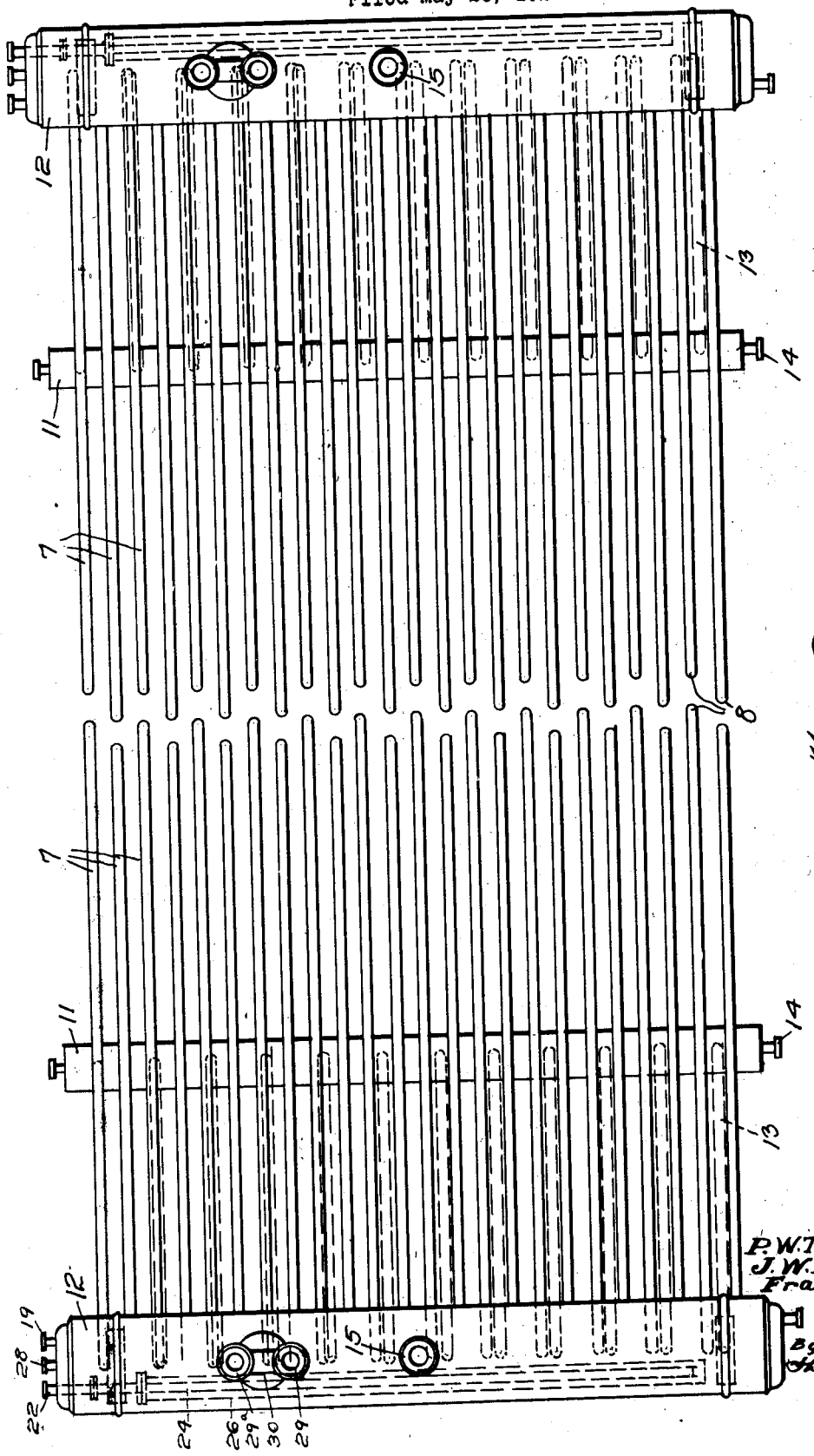
Figure 2 is a plan view of the screen elements.
Figure 3:
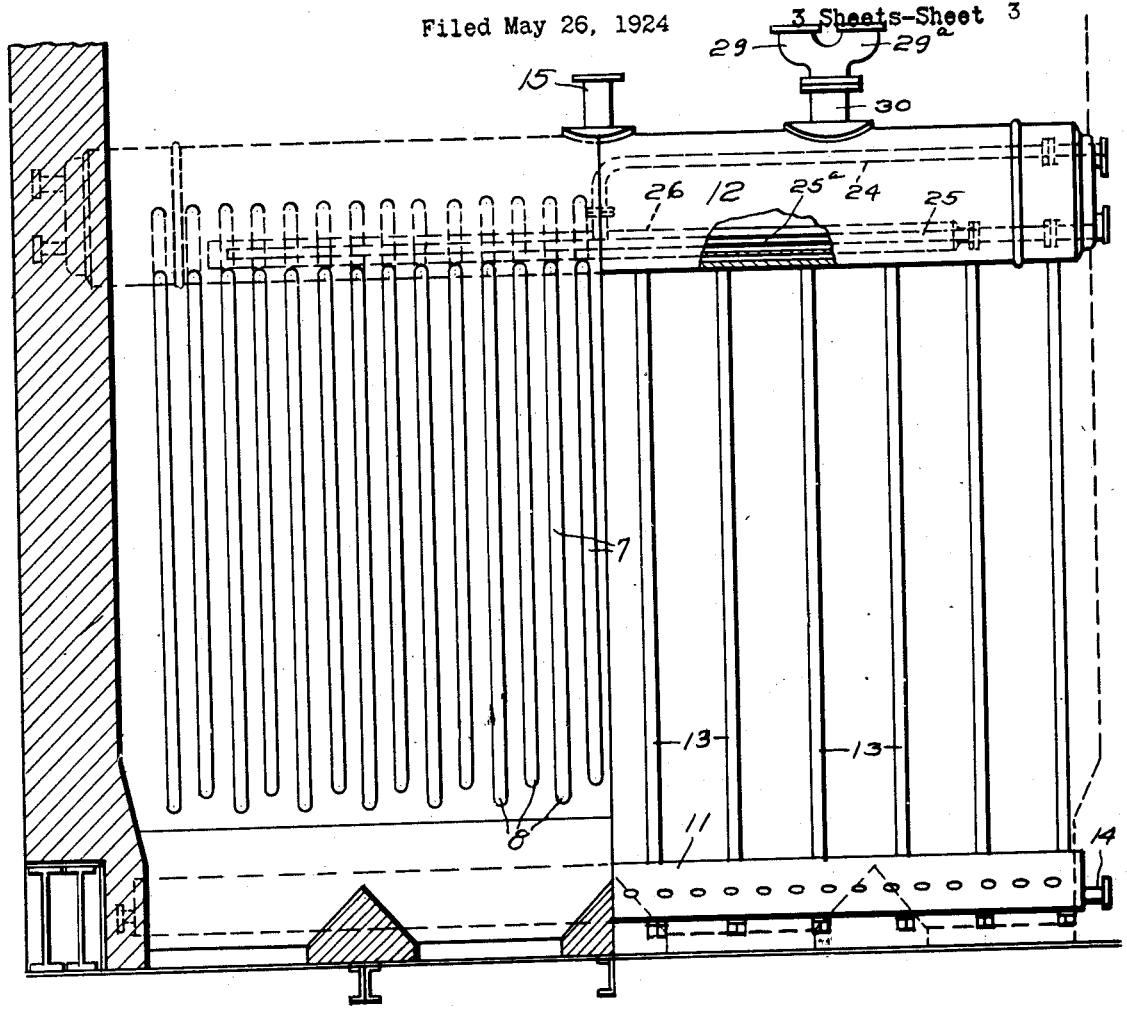
Figure 3 is a view partly in longitudinal section and partly in elevation.

In the drawings, 5 designates the combustion chamber of a furnace and 6 the refractory lining thereof. There are two tube screens, one upon each side of the furnace and since these two tube screens are similar to each other a description of one will serve for both. Each tube screen comprises a row of tubes 7, the major portions of which lie within the combustion chamber and between the point of maximum heat and the refractory material 6. The lower portions of these tubes are bowed, as indicated at 8 and extend outwardly through the furnace walls, at 9 the bowed portions of these tubes are staggered, as shown. This facilitates circulation of the gases through and about these portions of the tubes and also aids in preventing accumulation of ash on said tubes. The ends of these outwardly extending portions are connected at 10 to a drum or header 11. The upper ends of the tubes 7 extend outwardly through the furnace walls and are connected to a relatively large drum or header 12. Return tubes 13 extend from the bottom of the drum 12 to, and enter the top of drum 11. The drum 11 not only serves as a common connecting means between the lower ends of tubes 7 and 13 but it serves as a blow-off or a mud drum and to that end is provided with a blow-off connection at 14. Each drum 12 is provided with a main steam outlet 15 which may be in communication with the main steam space of the boiler proper, or the steam may be directed to any other desired point. For purposes of illustration I have indicated two valves, 16 and 17, connected to a T 18, said T 18, being in turn, connected to outlet 15. The valve 16 being open and valve 17 being closed, steam from the drum 12 may pass to the steam space of the boiler, or if valve 16 be closed and valve 17 be open, the steam may be directed to any desired point or even to the atmosphere. By virtue of this arrangement the steam generated in the screens may be delivered to the boiler and utilized along with the steam generated by the boiler. However, if one of the tubes 7 should become impaired, the pressure upon the screen could be reduced to atomospheric by closing valve 16 and opening valve 17. A leak which would be a severe one under boiler pressure, might show up very little, or not at all, under no pressure. Thus it would be possible to keep the entire screen in operation until a convenient time could be found for the repair of the faulty tube.

Outlets 19 and 20 upon the ends of the drum 12 provide means for the attachment of water columns, from which the water level in the system may be readily ascertained, one of said water columns being indicated at 21. It is manifest that if the water screen system is to be independent of the boiler water supply, means must be provided for supplying water to said system. To this end we provide in the ends of the drums 12, connections 22 and 23 which serve to receive the two branches 24 and 25 of a feed water line. Connection 23 is a main feed water connection, and connection 22 is an auxiliary feed water connection. The branch 24 extends along and lies within a troughlike member 26 and has a plurality of evenly spaced holes in its bottom. The branch 24 joins branch 25 at a point about half way along the length of the drum. By virtue of this arrangement the feed water is delivered at a uniform temperature throughout the length of the drum. A feed regulator connection is indicated at 28 upon the end of each of the drums. Branches 29 and 29ᵃ of an outlet 30 serve to receive conventional safety valves.

Among the important advantages of the arrangement herein shown and described the following are to be particularly noted. The tubes are extended transversely of the furnace and complementally substantially span the same. Their bowed portions are disposed substantially centrally of the furnace, below the zone of highest temperature. The bowing of the tubes in the manner indicated increases the effective length of those portions of the tubes, and provides a relatively large area of heat absorbing surface in the central region of the furnace below the zone of combustion. The net result is that the cooling effect on the ash is greatest where most needed, while, at the same time, the capacity for steam generation is increased.

It is further to be noted that the drums 12 are more than mere headers. That is, they are truly drums in the sense that they are of such capacity as to constitute reservoirs for a considerable quantity of water. If these elements were mere headers there would be such constant agitation and ebullition of the water therein as would result in the passage of a very moist steam to the main boiler from these drums. By making the drums of considerable capacity, and maintaining a considerable body of water therein, a much drier steam can be delivered from said drums to the main boiler. Further, the maintenance of this considerable quantity of water in the drums insures an adequate supply of water for the several tubes of a screen and prevents their becoming burnt. It is important to note that the arrangement proposed is such that a local circulation will be maintained in each of the tube screens. While it is possible to deliver the steam generated in these auxiliary boilers to the steam space of the main boiler, that is as far as the connection between the main and auxiliary boilers goes; the circulation in the auxiliary boiler is wholly independent of the circulation in the main boiler, and this is a feature of advantage whether the feed water supply be independent of the main boiler or not. The local circulation in the auxiliary boilers or water screens results in depositing whatever mud or other impurities may be present in the system, in the mud drums 11, and since these mud drums are provided with blow-offs 14, it follows that the circulation in these auxiliary boilers may be kept unimpeded at all times, wholly independent of the condition of the main boiler.

It is to be understood that the invention is not limited to use in connection with furnaces wherein the refractory material lies at an angle and indeed it is not limited to use in connection with any particular type of furnace whatever. On the contrary it is intended to cover broadly a means for providing a tube screen that is independent of the main circulatory system of a steam generator, retort or other device, irrespective of type, whereby steam is generated or heat absorbed, and also irrespective of the type of furnace to which this screen may be applied and irrespective of the particular arrangement of the piping and other elements of the screen. Consequently it is to be understood that the invention includes within its purview whatever changes fairly come within the terms or the spirit of the appended claims.

Having described our invention what we claim is:

1. The combination with a steam boiler furnace having opposite side walls, the major portions of which lie at an inclination with respect to the vertical, of a water screen for each of said side walls, each of said screens comprising a plurality of bowed tubes disposed in a row along the corresponding side wall and close enough together to constitute the said screen for the adjacent side wall, said tubes lying laterally of said wall and having their upper and lower ends projected through said wall, a horizontal drum extending lengthwise of the furnace outside each of the side walls with which the upper ends of said tubes are connected, horizontal headers extending longitudinally of the furnace to which the lower ends of the tubes are connected and return tubes between the drums and headers, the bowed portions of the opposed sets of tubes lying adjacent each other.

2. A structure as recited in claim 1 in combination with a perforated feed water pipe extending longitudinally of each of the drums, said pipes being independent of the feed water supply of the boiler and being perforated to discharge feed water at a plurality of points throughout the length of the drums to equalize the temperature of the water fed to the several tubes.

3. In a device of the character described the combination with the combustion chamber of a steam boiler, of a plurality of screen tubes extending transversely of the combustion chamber and lying in spaced relation to the side walls thereof and comprising bowed portions at the lower portion of the combustion chamber, the bowed portions of alternate tubes being staggered with respect to the corresponding portions of the intermediate tubes and means for feeding water to said tubes independently of the circulatory system of the boiler.

4. The combination with the combustion chamber of a steam boiler furnace of a pair of screens comprising a plurality of water tubes extending laterally of and overlying the walls of the said chamber at each side of the furnace and lying in spaced relation to said walls, each of said tubes comprising a bowed portion at the bottom of the combustion chamber, the bowed portions of the tubes of each screen being arranged in staggered formation to form alternate projected and retracted portions, the projecting tubes of one screen being opposed to the retracted tubes of the other screen and means for feeding water to all of said tubes independently of the circulatory system of the boiler.

5. The combination with the combustion chamber of a steam boiler furnace and its refractory side walls, of a water screen extending along opposite walls of the furnace, each of said screens comprising a plurality of bowed tubes which extend laterally of and lie in spaced relation to the respective wall of the furnace, a drum outside each of said opposite walls, the upper ends of said tubes of each screen passing through the corresponding furnace wall and being connected to said respective drum, a mud drum outwardly of each of said opposite walls to which the lower ends of said tubes of said screen are connected, return tubes connecting each drum and the corresponding mud drum, means for feeding water to said drums and tubes independently of the circulatory system of the boiler, and means for connecting said drums to the circulatory system of the boiler, the bowed portions of the opposed sets of tubes lying adjacent each other.

6. The combination with a steam boiler furnace having a side wall, of a water screen for said side wall comprising a longitudinal row of tubes, each of said tubes having an intermediate portion disposed within the furnace and upper and lower end portions which pass through the side wall to the outside of the furnace, the intermediate portions of the tubes overlying the side wall in spaced relation thereto and extending in a generally vertical direction, a horizontal drum extending lengthwise of the furnace and outside the side wall with which the upper ends of the tubes are connected, a horizontal header outside a lower portion of the wall to which the lower ends of the tubes are connected, return tubes between the drum and header and means for supplying feed water to said drum independently of the circulatory system of the boiler.

7. In combination, a main boiler combustion chamber having refractory walls, a combined auxiliary boiler and water screen for the combustion chamber wall comprising a longitudinal row of screen tubes within the combustion chamber, extending substantially throughout the length of the combustion chamber disposed in a generally vertical direction and lying in such spaced relation to each other, and in such spaced relation to the refractory walls as to permit free circulation of the products of combustion there-around, return tubes outside the combustion chamber, a chamber lying wholly outside of said combustion chamber constituting a steam space and a common connecting means between the upper ends of the screen and return tubes, means for establishing connection between the lower ends of the screen and return tubes, and a feed water supply for the auxiliary boiler, which is wholly independent of the circulatory system of the main boiler, the generally vertical disposition of the screen and return tubes being such as to induce a local circulation in the auxiliary boiler that is wholly independent of the circulatory system of the main boiler.

8. In combination, a main boiler combustion chamber having refractory walls, a combined auxiliary boiler and water screen for the combustion chamber wall, comprising a longitudinal row of screen tubes within the combustion chamber extending substantially throughout the length of the combustion chamber, disposed in a generally vertical direction, and lying in such spaced relation to each other, and in such spaced relation to the refractory walls as to permit free circulation of the products of combustion therearound, return tubes outside the combustion chamber, a chamber lying wholly outside of said combustion chamber, constituting a steam space, and a common connecting means between the upper ends of the screen and return tubes, means for establishing connection between the lower ends of the screen and return tubes, and a feed water supply for the auxiliary boiler which is wholly independent of the circulatory system of the main boiler, the generally vertical disposition of the screen and return tubes being such as to induce a local circulation in the boiler that is wholly independent of the circulatory system of the main boiler, and means for conducting steam from the steam space of the auxiliary boiler to the main boiler.

9. The combination with the combustion chamber of a main boiler, of a pair of auxiliary boilers associated therewith, each including a series of bowed tubes spaced longitudinally along the combustion chamber of the furnace, with their upper and lower end portions projected through the walls of the furnace and with their bowed portions disposed substantially at the center line of the furnace and near the bottom thereof.

10. The combination with the combustion chamber of a main boiler, of a pair of auxiliary boilers associated therewith, each including a series of bowed tubes spaced longitudinally along the combustion chamber of the furnace, with their upper and lower end portions projected through the walls of the furnace and with their bowed portions disposed substantially at the center line of the furnace and near the bottom thereof, and means disposed upon the exterior of the furnace for establishing communication between the upper and lower end portions of the respective tubes so that a local circulation may be maintained therethrough.

11. The combination with the combustion chamber of a main boiler, of a pair of auxiliary boilers associated therewith, each comprising a series of bowed tubes spaced longitudinally along the combustion chamber of the furnace, with their upper and lower end portions projected through the walls of the furnace and with their bowed portions disposed substantially at the center line of the furnace and near the bottom thereof, return tubes disposed exteriorly of the furnace upon each side thereof, a drum constituting a common connecting means between the upper ends of the first named tubes of each boiler, and the return tubes, and a mud drum constituting a common connecting means in each auxiliary boiler between the lower ends of the return tubes and the lower ends of the first named tubes.

12. A structure as recited in claim 9, wherein the bowed portions of the tubes of each auxiliary boiler are staggered, with the projected tubes of one auxiliary boiler disposed opposite to the retracted tubes of the opposite auxiliary boiler, and vice versa.

13. The combination with the combustion chamber of a main boiler adapted to burn fine fuel in suspension and having downwardly convergent refractory walls, of a pair of auxiliary boilers associated therewith, each of which comprises a series of tubes, the intermediate portions of which are bowed and the upper and lower end portions of which are projected to the exterior of the furnace, the bowed portions of the tubes of one auxiliary boiler being disposed in juxtaposition to the bowed portions of the tubes of the other auxiliary boiler, and substantially at the center of the furnace, the upper runs of said tubes being downwardly divergent from said refractory walls, and the tubes of each boiler being disposed in spaced relation to each other along the length of the furnace.

14. A structure as recited in claim 13, in combination with a drum for each auxiliary boiler disposed outside of the furnace and to which the upper ends of all of the tubes of said boiler are connected, return tubes for each boiler leading from the bottom of said drums, and a mud drum for each auxiliary boiler constituting a common connecting means between the return tubes of that boiler and the lower ends of the first named tubes.

15. In combination, a combustion chamber, two rows of tubes at the bottom of the chamber extending inwardly and downwardly to about the middle portion of the chamber, one row extending inwardly from one side of the chamber, and the other row extending inwardly from the opposite side of the chamber, the lower ends of the tubes passing to the extremity of the combustion chamber, means connecting the outer ends of the tubes so that an independent local circulation may take place therethrough, and a feed water supply for the tubes that is independent of the feed water supply of the boiler with which the tubes are associated, so that said tubes are caused to constitute true boilers auxiliary to the main boiler, capable of independent circulation and capable of maintenance of a feed water supply therein independent of the circulation of the main boiler.

In testimony whereof we hereunto affix our signatures.

P. W. THOMPSON.
J. W. PARKER.
FRANK THORP.